United States Patent [19]
Gibson

[11] Patent Number: 5,146,965
[45] Date of Patent: Sep. 15, 1992

[54] ROUTER ATTACHMENT

[76] Inventor: Nigel Gibson, 10 Nichols St., Kings Meadow, Tasmania 7249, Australia

[21] Appl. No.: 784,530

[22] Filed: Oct. 29, 1991

[30] Foreign Application Priority Data

Oct. 29, 1990 [AU] Australia ............... PK3070

[51] Int. Cl.⁵ .............. B27M 1/00; B27M 3/00; B27C 5/02
[52] U.S. Cl. ................ 144/372; 144/134 D; 144/136 C; 144/371; 144/144 R; 144/144.5 R; 144/1 F; 409/125; 409/130; 409/182
[58] Field of Search ........ 409/125, 130, 182; 144/134 R, 134 D, 136 R, 136 C, 144 R, 144.5, 371, 372, 1 F

[56] References Cited

U.S. PATENT DOCUMENTS 3,332,462  7/1967  Williams .................. 144/136 C
3,902,042  8/1975  Goldfarb et al. .......... 144/134 D Primary Examiner—W. Donald Bray

[57] ABSTRACT

A router attachment which has
a body member, having a mounting end, mountable to a router; and a work end having an inclined guide surface capable of engaging a variable width slot in a template;
the body member has a centrally located bore passing from said mounting end to said work end.

14 Claims, 3 Drawing Sheets

ROUTER ATTACHMENT

This invention relates to a router attachment which is capable of producing variable depth routing, a template adapted for use therewith, a router including such an attachment and a method of routing.

Known techniques and apparatus for providing variable depth routing are generally either too expensive, requiring large and complex machinery, such as overhead routers and computerized robot-like routers, or are excessively labour intensive, such as methods of hand carving. This is particularly so, where symmetrical or more complex patterns are involved. Thus, most modern techniques of variable depth routing, and more importantly the modern designs and patterns of variable depth routing, are beyond the means of most businesses and tradesman.

Accordingly, it is an object of the present invention to overcome or at least alleviate one or more of the difficulties associated with the prior art.

The present invention resides in a router attachment including:

a body member, having a mounting end mountable to a router, and a work end having an inclined guide surface capable of engaging a variable width slot in a template;

said body member having a centrally located bore passing from said mounting end to said work end.

The router attachment is suitable for use with a router having a cutter member. The cutter member preferably comprising a shaft, which is releasably secured within a collet or a chuck, and a cutter tip which includes a cutter blade or blades. The collet is rotatably secured to the body of the router for rotation about a central axis. The body member is preferably substantially annular with the centrally located bore extending there through communicating with each end of the body member. Most preferably, the bore is coaxialy arranged within the body member.

Accordingly, a further embodiment of the present invention resides in a variable depth router including a cutter member having a cutter tip and a shaft, and a router attachment as previously described;

wherein the router attachment is adapted to cooperate with the cutter member so that the cutter member is located within the bore of the body member, the shaft being releasably secure within a collet located near the mounting end and the cutter tip protruding externally of the work end.

The router attachment may be mounted on a router by passing the cutter member through the bore to allow for the arrangement where the cutter tip is at least partially projecting through the inclined guide surface of the work end. The router attachment may be mounted by means of a plate or even to the shaft or collet by use of appropriate bearings or bearings attached to a sleeve. In these arrangments, the router attachment is capable of moving with the cutter member in a lateral direction, but does not necessarily rotate with the cutter member. However, the attachment member may be mounted directly to the collet of the router so as to rotate therewith, or may alternatively be mounted by a bearing to the collet or shaft so as to rotate therewith but only until the attachment strikes a template.

The work end of the body member preferably comprises a single inclined guide surface in the form of an inverted and truncated cone. When mounted on a router, the guide surface is inclined towards the axis of the cutter member from a point of maximum width to a point of minimum width. The minimum width of the guide surface preferably corresponds generally with the maximum width of the cutter tip itself.

It will be appreciated that the inclined guide surface may be radially discontinuous, such as may be provided by simply having opposing inclined arms mounted on either side of the cutter member. Any such configuration may be utilized provided the cutter member is capable of being supported away from each side of a template slot, and provided there is an inclined surface to act as a guide.

It is most preferred that the router attachment of the present invention includes a substantially planar template having at least one slot. The slot is preferably variable but it should be appreciated that it may be of constant width. It is preferred that the attachment member and template form a kit to complete the router attachment.

The inclined guide surface, should be capable of engaging with the slot of the template, the slot being of such a width to allow the cutter tip to pass through the slot.

Accordingly, a further aspect of the present invention resides in a substantially planar template for use in a variable depth router as previously described wherein the template includes at least one slot, the width of the slot not being wider than the maximum width of the inclined guide surface and a minimum width equal to or greater than the maximum width of the cutter blades. It should be appreciated however that these widths are merely preferred and it is contemplated that widths that extend beyond or less than these preferred widths are contemplated.

When in use, the template is placed on a surface of a piece to be routed, and the router, with the router attachment member of the invention mounted thereto, engages the template. The inclined guide surface is placed in contact with a slot, preferably with the router held vertically, and is moved to slide along the slot while remaining in contact with the slot. As the width of the slot varies the contact point with the guide surface of the attachment moves axially up or down the guide surface, which adjusts the rise and fall of the cutter tip towards or away from the piece to be routed. Thus, if the minimum width of the slot is such that, when in place, the point of the cutter tip is immediately adjacent the piece, any increase in width of the slot will guide the cutter tip into the piece to begin the routing process.

Of course, a large range of configurations of slots for templates may be used depending on requirements for particular designs. It will also be appreciated that where a particular design requires a constant depth of cut, slots of constant width may be used.

Further, a number of templates may be used in combination to provide a particular design. For instance, many complex designs are symmetrical about either a line or lines, or a point. Thus, one template may produce half a design and then turned over or translated to produce the other half. Alternatively, one template may produce one quarter of a design, or be required to be placed in four positions. Further still, two or more templates may be used over the same area of work to add additional features. This is particularly useful where a particular pattern would require a template to have an annular slot, which of course would cause the solid centre to fall out. Such patterns not obtainable by a single template may be produced by overlapping two or more templates with appropriate slots.

In a preferred form the templates may be secured in a frame for stable use over a work-piece. The frame may be subsequently secured to the work-piece so that if the template requires turning, or if a second template is required as described above, the correct alignment with the work-piece is maintained. Further, a frame may also be used to hold a number of templates together, in a side-by-side relationship.

It is envisaged that the templates adapted for use with the router attachment may be produced by the use of a computer-aided-design (cad) system linked to a digitizer or the like. The patterns may either be directly drafted into the cad system, or may be sketched and then scanned with the digitizer. Preferably the system will then be capable of determining the required number and configuration of slots and templates, and will be linked to a penta graph cutting system for possible mass production. An advantage of this system is that software may be transferred to manufacturers and distributors, rather than transferring templates themselves.

In a preferred form, the router attachment of the invention is mounted to a plunge router. Plunge routers generally have support means which support the cutter tip perpendicularly to the work-piece, and are spring loaded such that the cutter tip is urged away from the work-piece. In this way, the plunge router may be placed over the work-piece and the user forces the cutter member into the work-piece to begin routing. With the router attachment of the invention mounted to such a plunge router, the adapted plunge router may be readily used with the above described template to produce a variable depth carving.

In yet a further aspect of the present invention, the invention resides a method of producing a routed article by providing a variable depth router as previously described; and affixing a template with at least one variable width slot to a surface to be routed, wherein the variable depth router is urged toward the template to engage the inclined guide surface with the slot, and apply relative lateral movement such that the relative height of the cutting blade will vary depending upon the width of the slot, and will contact the surface to be routed at least at one point.

It shall also be appreciated, that the thickness of the template, at the relative depth at which the cutter tip extends beyond the inclined guide surface, will effect the depth of the routered groove. In use, these variables should be kept constant, howeve various effects can be guided by altering one or both of these variables. A preferred depth for the cutter tip to extend beyond the inclined guide surface would be so that a constant line at 45° relative to the shaft is obtained between a cutter blade and the inclined guide surface.

A carved work produced by this invention may also be used as a mold to produce a raised pattern on plaster works or the like.

In order to assist in arriving at an understanding of the present invention, a preferred embodiment is illustrated in the attached drawings. However, it should be understood that the following description is illustrative only and should not be taken in any way as a restricion on the generality of the invention as described above.

Figure 1:
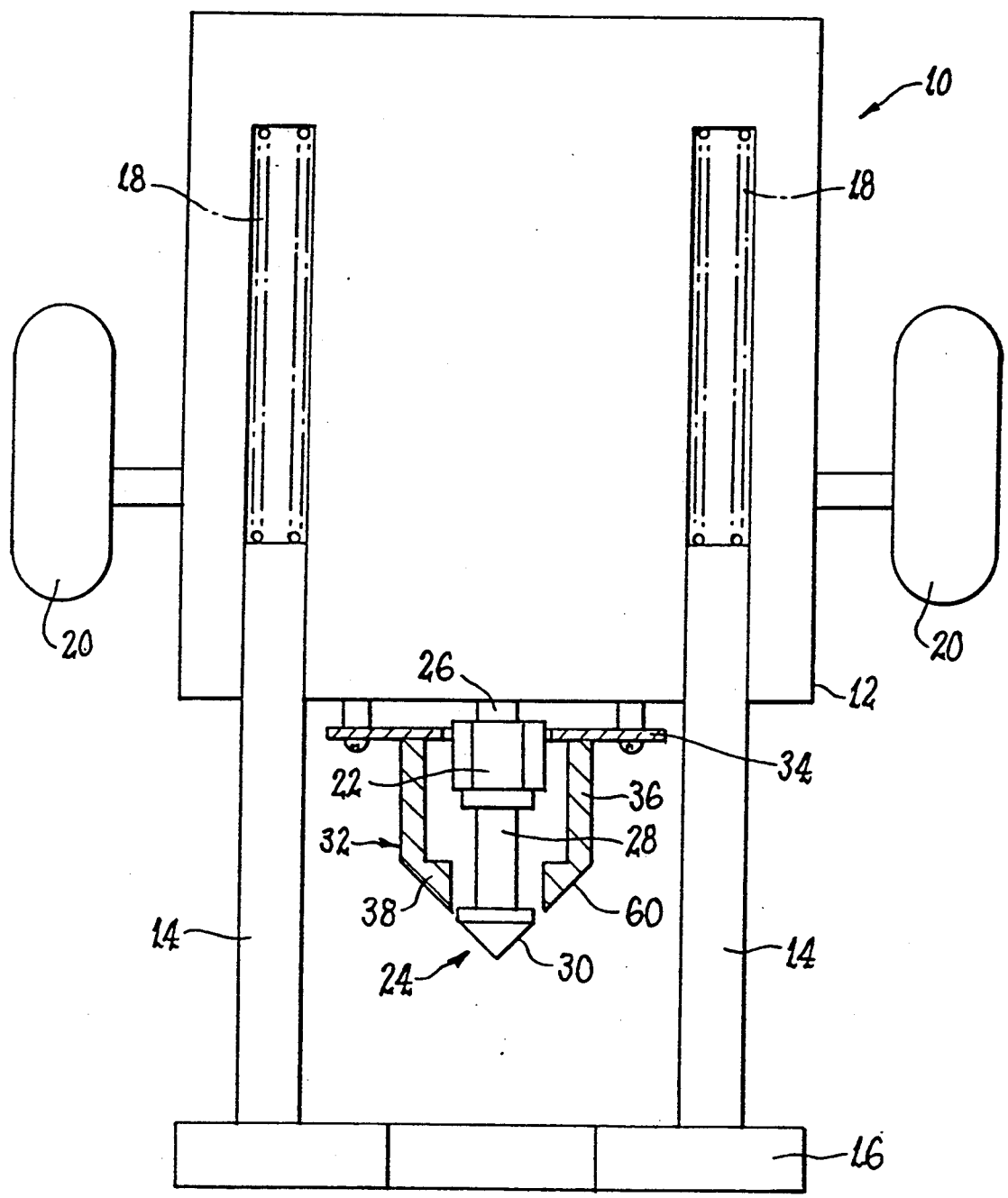
FIG. 1 is a section view of a plunge router fitted with a router attachment according to an embodiment of the present invention.

Illustrated in FIG. 1 is a plunge router 10 having a body 12 supported on legs 14 above a work plate 16. The legs 14 are mounted on springs 18 which serve to urge the body 12 away from the base plate 16. Hand grips 20 are provided for a user to urge the router towards a work-piece placed below the work plate 16.

The router 10 includes a collet 22 for releasably securing a cutter member 24. Collet 22 is rotatably secured to the motor (not shown) of the router 10 by an attachment shaft 26. The cutter member 24 comprises a shaft 28 and a cutter tip 30.

Mounted to the body 12 of the router 10 is the router attachment 32 of the present invention. The router attachment 32 is bolted to a mounting plate 34 which in turn is mounted to the body 12. The router attachment 32 comprises a substantially annular body which is defined by a cylindrical section 36, and an inverted and truncated conical section 38 which is turn defines an inclined guide surface 60.

Figure 2:
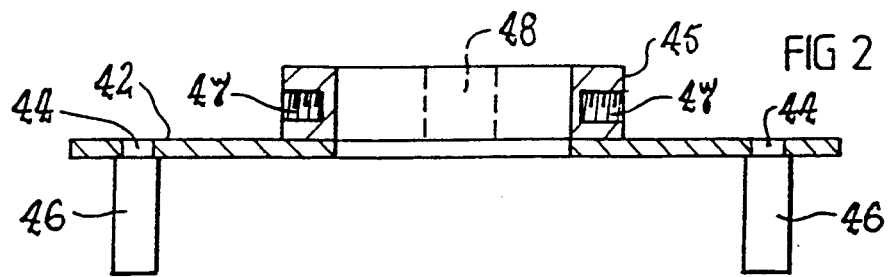
FIG. 2 is a section view of the mounting plate for the attachment in FIG. 1.
Figure 3:
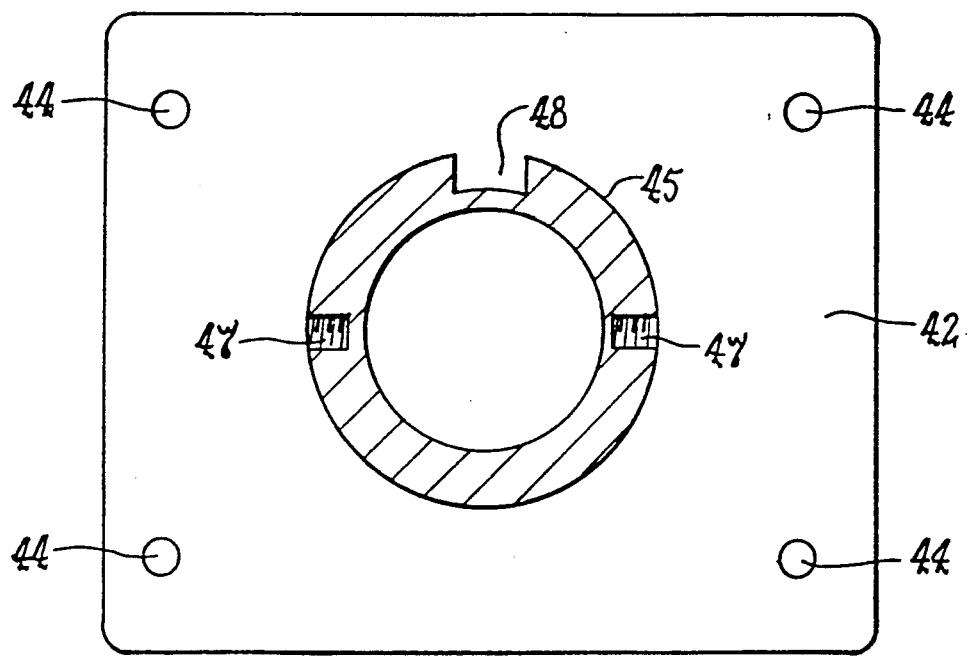
FIG. 3 is a plan view of the mounting plate for the attachment of FIG. 1.

FIG. 2 and FIG. 3 shows the mounting plate 34 in greater detail. Illustrated is a base plate 42 having four bolt holes 44 for attachment to the body of the router. Hollow spacers 46 are provided to separate the base plate 42 from the body of the router, which are capable of receiving bolts (not shown) therethrough. Centrally located on base plate 42 is an annular boss 45. Boss 45 includes external threaded apertures 47 and an alignment aperture 48 for receiving and securing to the router attachment 32. Thus, boss 45 acts as a bush and is sleeved by the mounting end 50 of the router attachment 32 (see FIG. 4) when the router attachment 32 is attached thereto. Grub screws may then be used to secure the router attachment to the mounting plate.

Figure 4:
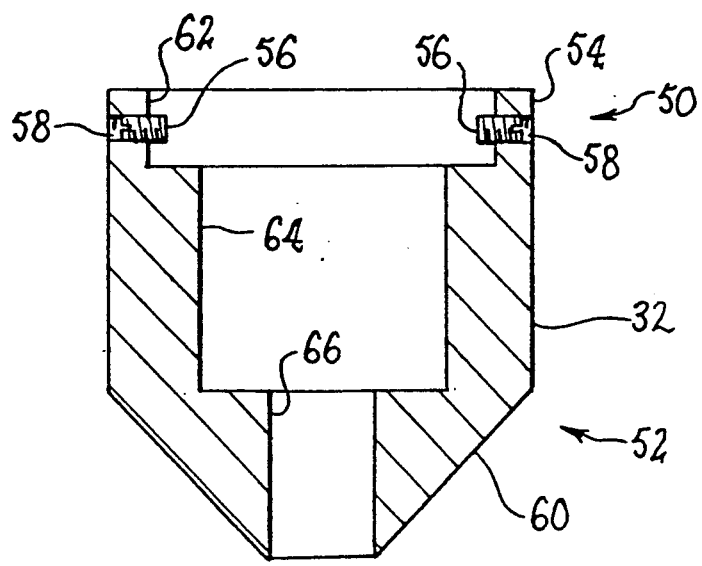
FIG. 4 is a section view of the router attachment in FIG. 1.

FIG. 4 shows a router attachment 32 having a mounting end 50 and a work end 52. The mounting end 50 is defined by an annular sleeve portion 54 which may be secured to boss 45 by grub-screws 56 in threaded apertures 58. The work end 52 is defined by an inclined guide surface 60 formed by an inverted and truncated cone. Intermediate the mounting and work ends 50, 52 is an annular body of constant diameter.

The router attachment 32 is substantially annular and surrounds an opening defined by a mounting bore 62, an intermediate bore 64, and a work bore 66. The opening is such that the attachment 32 is capable of being mounted about a router collet to be spaced therefrom. When mounted on a router, the cutter tip projects beyond the work end 52 such that the widest part of the cutter tip is adjacent or slightly beyond the narrowest part of the work end 52. This is readily discernible from FIGS. 6a and 6b.

Figure 5:
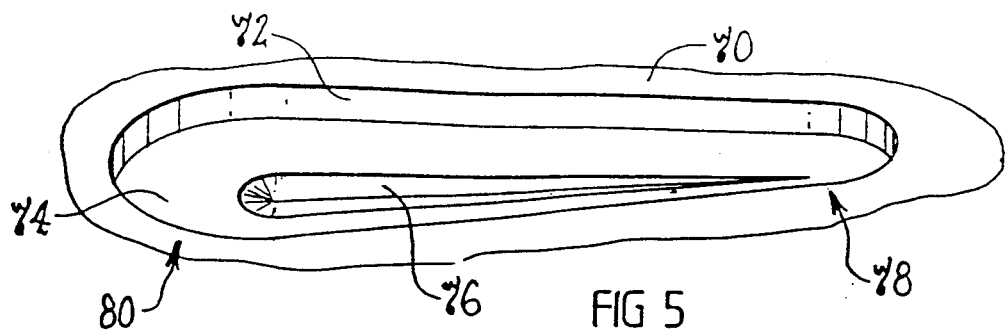
FIG. 5 is a perspective view of a template on a work-piece for use with the embodiment of FIG. 1.
Figure 6A:
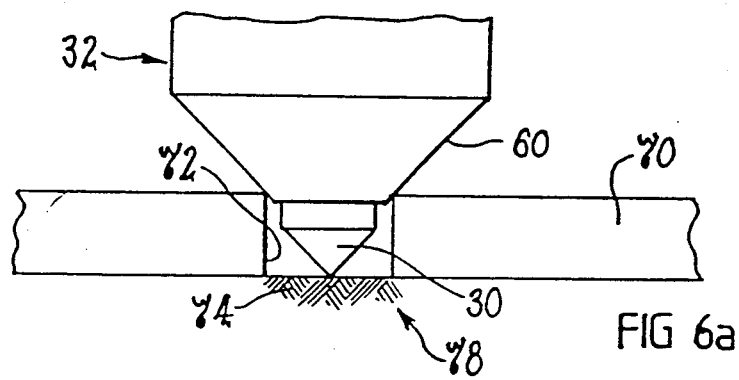
FIGS. 6a and 6b are partial side views of the embodiment of FIG. 1 in use with the template of FIG. 4.
Figure 6B:
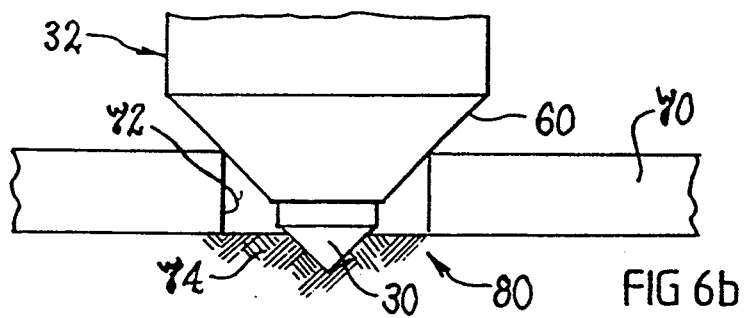

FIG. 5 illustrates a template 70, having a variable width slot 72, resting on the surface of a work-piece 74. A variable depth carving 76 is shown in the surface of the work-piece 74. FIG. 6a corresponds to the narrow end 78 of slot 72 when a router having a router attachment 32 is placed therein. Due to the thickness of the template 70, the contact thereof with the bottom portion of the inclined guide surface 60 prevents the cutter tip from contacting the work-piece 74. As the router is moved along the slot 72 from the narrow end 78 to the wide end 80, with the inclined guide surface 60 remaining in contact with the template 70 on either side of the slot 72, the increase in width allows the point of contact to move along the inclined guide surface 60, allowing the cutter tip to fall, and produce a carving having a gradual increase in depth and width. The position of the router at the point of slot maximum width is shown in FIG. 6b, where a maximum depth cut has been produced. In this example, the template is 18 mm thick, and has a minimum slot width of 32 mm and a maximum slot width of 58 mm. This allows a cutter tip of diameter 26 mm and depth 13 mm to produce a maximum cut at the widest slot diameter, given the presence of a 3 mm clearance from the shoulder of the cutter tip to the attachment, and a further 2 mm stop along the axial distance of the inclined guide surface. Of course, various of these dimensions may be altered depending on requirements for particular works, and specifially depending on depth of cut required, size and configuration of cutter tip, and the angle of inclination of the guide surface. In respect of this latter parameter, the illustrated attachment has a guide surface at an angle of 45°. This angle is preferred as greater angles require less movement to provide the same depth cut, and thus require great care in use, and smaller angles require very large variations in slot width which are impractical and difficult to work with.

Figure 7:
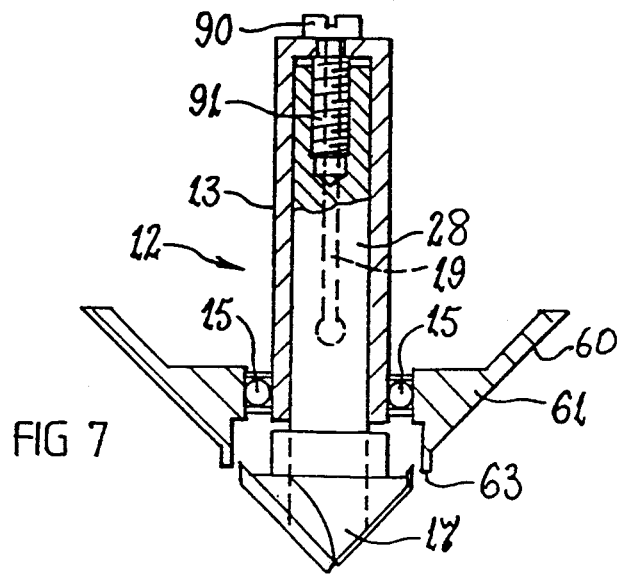
FIG. 7 is a section view of an alternative embodiment of a router attachment in accordance with the invention.

FIG. 7 illustrates an alternative to the invention, where the body 12 is fitted over the shaft 28 by sleeve 13. The sleeve defines the mounting end of the body of the router attachment. In particular, the sleeve 13 is held over the shaft by a recessed adjusting screw 90 in bush 91. This embodiment allows for a more universal application of the attachment, and removes the need to include a mounting plate.

The inclined guide surface 61 with protective stops 63 is connected to the sleeve 13 by means of sealed and caged bearings 15. The cutter blades 17 are at an angle of 45° to the shaft and forms a relatively continuous line with the angle of the inclined guide surface 63. The screw 90 and bush 91 may form part of or be connected directly to a router. The sleeve may releasably be secured with a collet.

The shaft 28 may also include a internal crevice 19 that allows the screw and bush to be secured with the shaft.

Thus, the attachment of the present invention provides a simple alternative to the known sophisticated machinery, which may be easily attached to a standard router. The attachment allows for an provides rapid variable depth routing when used in conjunction with the templates of the invention.

Those skilled in the art will appreciate that there may be many variations and modifications of the configurations described herein which are within the scope of the present invetnion.

The claims defining the invention are as follows:

1. A router attachment comprising:
   a body member, having a mounting end, adapted to be mounted to a router;
   and a work end having an inclined guide surface capable of engaging a variable width slot in a template;
   said body member having a centrally located bore adapted to encircle a shaft of a cutter member of a router.

2. A router attachment according to claim 1, further including a template having at least one slot, said slot being of such a width to engage said inclined guide surface of the body member;
   wherein the body member and template are adapted to have lateral movement relative to each other.

3. A router attachment according to claim 1, wherein the inclined guide surface is in the form of an inverted and truncated cone.

4. A router attachment according to claim 1, wherein said body member is of a substantially annular configuration, having a coaxial axis with said bore, and said cutter member being adapted to be located with a collet of a router.

5. A router attachment according to claim 1 wherein said mounting end includes a sleeve adapted to surround said cutter member, said sleeve also being adapted to be located within a collet or a router.

6. A variable depth router comprising;
   a cutter member including a cutter tip and a shaft;
   a router attachment according to claim 1 or 2;
   said cutter member being located within said bore, the shaft being releasibly secured to a collet located near the mounting end of the body member, and the cutter tip protruding externally of the work end.

7. A variable depth router according to claim 6 wherein said cutter tip protrudes sufficiently so that the edge of a cutter blade and the inclined guide surface provide a substantially continuous line at a predetermined angle relative to the shaft.

8. A variable depth router according to claim 6 further including biasing means to urge the cutter member away from a surface to be routed.

9. A variable depth router according to claim 8 wherein said biasing means includes at least one spring located within a frame supporting the cutter member.

10. A substantially planar template for use in a variable depth router according to claim 6 characterized in that the template includes a slot, the width of the slot not being wider than the maximum width of the inclined guide surface and a minimum width equal to or greater than the maximum width of the cutter tip.

11. A template according to claim 10 characterised in that the template, in use, is removably affixed to the surface of an object to be routered; and
    is of a depth to allow the cutter tip to contact the surface of the object to be routered.

12. A template according to claim 10 characterised in that the slot is of a variable width.

13. A method of producing a routered article comprising the steps of:
    providing a variable depth router according to claim 6;
    affixing a template with at least one variable width slot to a surface to be routered;
    urging the variable depth router toward the template to engage the inclined guide surface with the slot, applying relative lateral movement between the router attachment and template, varying the relative height of the cutter blade, dependent upon the width of the slot, and the cutter blade contacting the surface to be routered at least at one point.

14. A method according to claim 13 also comprising the step of translating the template along a line of symmetry to produce a symmetrical routered pattern.

* * * * *